US012799819B2

(12) United States Patent
Cooley et al.

(10) Patent No.: US 12,799,819 B2
(45) Date of Patent: Nov. 17, 2026

(54) HINGE ASSEMBLY FOR A GATE

(71) Applicant: Universal City Studios LLC, Universal City, CA (US)

(72) Inventors: James Emmett Cooley, Orlando, FL (US); Jacob Michael DiNardi, Orlando, FL (US)

(73) Assignee: Universal City Studios LLC, Universal City, CA (US)

(*) Notice: Subject to any disclaimer, the term of this patent is extended or adjusted under 35 U.S.C. 154(b) by 1 day.

(21) Appl. No.: 18/985,865

(22) Filed: Dec. 18, 2024

(65) Prior Publication Data

US 2025/0237100 A1 Jul. 24, 2025

Related U.S. Application Data

(60) Provisional application No. 63/613,479, filed on Dec. 21, 2023.

(51) Int. Cl.
*E05D 11/06* (2006.01)
*E06B 11/08* (2006.01)

(52) U.S. Cl.
CPC .............. *E06B 11/08* (2013.01); *E05D 11/06* (2013.01)

(58) Field of Classification Search
CPC .......... E05D 7/06; E05D 7/04; E05D 7/0423; E05D 7/1044; E05D 3/02; E05D 11/1014; E05D 15/581; E05D 2007/0461; E05D 2007/0484; E05D 2007/0438; E05D 2007/0446; E05D 2015/587; E06B 9/04; E06B 11/022; E06B 11/02; E06B 11/04; E06B 11/06; E06B 11/08;
(Continued)

(56) References Cited

U.S. PATENT DOCUMENTS 165,619 A * 7/1875 Sanderson .......... E05D 11/1014
16/318
650,658 A * 5/1900 Riley ........................ E05D 7/04
16/315
(Continued)

FOREIGN PATENT DOCUMENTS

CA 2057615 A1 6/1993
FR 2455157 A * 12/1980
(Continued)

OTHER PUBLICATIONS

PCT/US2024/061388 International Search Report and Written Opinion mailed Mar. 19, 2025.

*Primary Examiner* — Chuck Y Mah
(74) *Attorney, Agent, or Firm* — Fletcher Yoder P.C.

(57) ABSTRACT

A gate includes a gate post and a gate frame. The gate frame includes an axial member extending along an axis of rotation of the gate frame. The gate further includes a hinge assembly pivotally coupling the gate frame to the gate post. The hinge assembly includes an end cap having a flange portion fixedly coupled to the gate post and a shaft portion extending into the axial member of the gate frame. The end cap also includes one or more prongs extending from the shaft portion internally into the axial member substantially parallel to the axis of rotation. Furthermore, the hinge assembly includes a rod extending laterally through the axial member of the gate frame.

20 Claims, 7 Drawing Sheets

(58) Field of Classification Search
CPC ........... E06B 2009/002; E05Y 2900/40; E05Y 2900/402; Y10T 403/32557; Y10T 403/32591
See application file for complete search history.

(56) References Cited

U.S. PATENT DOCUMENTS

| | | | | |
|---|---|---|---|---|
| 1,294,044 | A * | 2/1919 | Buckwalter et al. | E05D 11/1007 16/351 |
| 2,604,653 | A * | 7/1952 | Anderson | E05F 1/1223 16/315 |
| 3,222,806 | A * | 12/1965 | Martin | E06B 11/04 49/237 |
| 3,858,274 | A * | 1/1975 | Burton | E05F 1/061 16/312 |
| 4,609,184 | A * | 9/1986 | Elkins, Sr. | A01K 1/0017 49/366 |
| 4,697,306 | A * | 10/1987 | Rhodes | E05F 1/063 256/26 |
| 5,367,745 | A * | 11/1994 | Roloff | E05F 1/1223 16/312 |
| 5,417,272 | A | 5/1995 | Marlowe et al. | |
| 6,460,220 | B1 * | 10/2002 | Jackson | E05F 1/1215 16/374 |
| 7,155,779 | B2 * | 1/2007 | Watkins | E05F 15/54 16/316 |
| 7,328,483 | B2 * | 2/2008 | Chen | H04M 1/0216 16/303 |
| 7,621,022 | B2 * | 11/2009 | Gandevia | E05D 9/005 16/385 |
| 8,477,505 | B2 * | 7/2013 | Samuels | G06F 1/1632 16/337 |
| 8,615,928 | B2 * | 12/2013 | Wang | E06B 9/04 49/55 |
| 8,943,652 | B2 | 2/2015 | Bacchetti | |
| 9,739,523 | B1 * | 8/2017 | Augsburger | E05D 3/02 |
| 10,006,233 | B2 | 6/2018 | Laurance | |
| 10,100,563 | B2 | 10/2018 | Murray et al. | |
| 2003/0009945 | A1 * | 1/2003 | Cheng | E05F 1/063 49/55 |
| 2011/0035906 | A1 | 2/2011 | Esaki et al. | |
| 2016/0083993 | A1 * | 3/2016 | Grewe | E05F 1/1223 29/428 |
| 2020/0087964 | A1 * | 3/2020 | Gentil | E05B 65/0014 |
| 2023/0349214 | A1 * | 11/2023 | Marsden | E05D 11/1007 |

FOREIGN PATENT DOCUMENTS

| | | | | |
|---|---|---|---|---|
| GB | 2359114 | A * | 8/2001 | E05F 1/063 |
| GB | 2430967 | A * | 4/2007 | E06B 9/04 |

* cited by examiner

HINGE ASSEMBLY FOR A GATE

CROSS-REFERENCE TO RELATED APPLICATION

The present application claims priority to and the benefit of U.S. Provisional Application No. 63/613,479, entitled "HINGE ASSEMBLY FOR A GATE," filed on Dec. 21, 2023, which is incorporated by reference herein in its entirety for all purposes.

BACKGROUND

The present disclosure generally relates to gates having internal hard stops configured to block rotation of the respective gate beyond a desired range of motion.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Amusement parks and other venues include swing gates to open and close certain areas to foot traffic. For example, a swing gate may be positioned at an entrance to a park attraction, and park guests may enter the park attraction via the swing gate. It may be desirable to limit a range of motion of the swing gate while minimizing external pinch points around the gate.

SUMMARY

Certain embodiments commensurate in scope with the present disclosure are summarized below. These embodiments are not intended to limit the scope of the disclosure, but rather these embodiments are intended only to provide a brief summary of possible forms of present embodiments. Indeed, present embodiments may encompass a variety of forms that may be similar to or different from the embodiments set forth below.

In an embodiment, a gate includes a gate post and a gate frame. The gate frame includes an axial member extending along an axis of rotation of the gate frame. The gate also includes a hinge assembly pivotally coupling the gate frame to the gate post. The hinge assembly includes a bushing disposed at an end of the axial member of the gate frame, such that the axial member is configured to rotate about the bushing. The hinge assembly further includes an end cap having a flange portion fixedly coupled to the gate post and a shaft portion extending through the bushing, into the axial member of the gate frame. Additionally, the hinge assembly includes a first prong and a second prong, each extending from the shaft portion internally into the axial member substantially parallel to the axis of rotation. Furthermore, the gate includes a rod extending laterally through the axial member of the gate frame between the first prong and the second prong internal to the axial member.

In another embodiment, a hinge assembly for a gate includes an end cap configured to rotatably couple a gate frame to a gate post. The end cap includes a flange portion configured to be fixedly coupled to the gate post, as well as a shaft portion configured to be inserted into an axial member of the gate frame. Additionally, the end cap includes a first prong and a second prong, each extending from the shaft portion. Furthermore, the hinge assembly includes a rod configured to extend laterally through the axial member of the gate frame between the first prong and the second prong.

In yet another embodiment, an end cap of a hinge assembly for a gate includes a flange portion configured to be mounted on a gate post and a shaft portion extending from the flange portion. The shaft portion is configured to be inserted into a gate frame, such that the shaft portion defines an axis of rotation of the gate. The end cap further includes a first prong extending from the shaft portion and a second prong extending from the shaft portion. The first prong and the second prong are spaced apart from each other across the axis of rotation.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
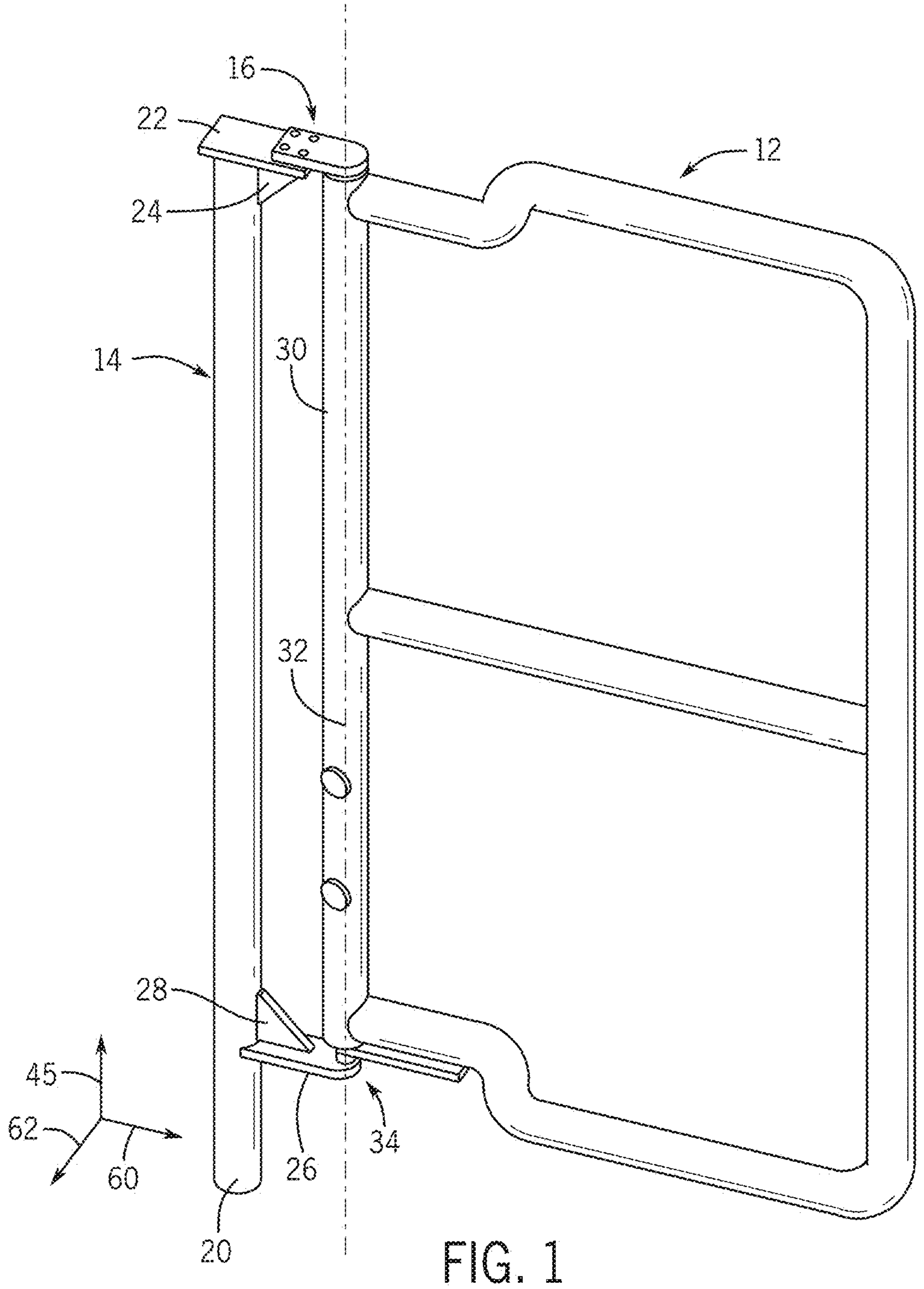
FIG. 1 is a perspective view of a gate, in accordance with embodiments of the present disclosure.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

As used herein, the terms "approximately," "generally," and "substantially," and so forth, are intended to convey that the property value being described may be within a relatively small range of the property value, as those of ordinary skill would understand. For example, when a property value is described as being "approximately" equal to (or, for example, "substantially similar" to) a given value, this is intended to mean that the property value may be within +/−5%, within +/−4%, within +/−3%, within +/−2%, within +/−1%, or even closer, of the given value. Similarly, when a given feature is described as being "substantially parallel" or "substantially perpendicular" to another feature, "generally parallel" or "generally perpendicular" to another feature, and so forth, this is intended to mean that the given feature is within +/−5%, within +/−4%, within +/−3%, within +/−2%, within +/−1%, or even closer, to having the described nature, such as being parallel to another feature, being perpendicular to another feature, and so forth. Further, it should be understood that mathematical terms, such as "planar," "slope," "perpendicular," "parallel," and so forth are intended to encompass features of surfaces or elements as understood to one of ordinary skill in the relevant art, and should not be rigidly interpreted as might be understood in the mathematical arts. For example, a "planar" surface is intended to encompass a surface that is machined, molded, or otherwise formed to be substantially flat or smooth (within related tolerances) using techniques and tools available to one of ordinary skill in the art. Similarly, a surface having a "slope" is intended to encompass a surface that is machined, molded, or otherwise formed to be oriented at an angle (e.g., incline) with respect to a point of reference using techniques and tools available to one of ordinary skill in the art.

The present disclosure is directed to a gate for use in a venue, such as an amusement park. As foot traffic (e.g., park guests) passes through the gate, the gate may swing between various positions to block and enable passage through the gate. The gate may be coupled to a gate post via a hinge, which enables rotation of the gate about the hinge. It may be desirable to limit a range of motion of the gate to prevent overtravel of the gate beyond desired closed and open positions. To this end, existing gates may include external structures designed to stop the gate from rotating past a certain position. Generally, the gate may rotate through its range of motion until the gate collides or abuts against an external structure. For example, an additional gate post may abut the gate in a closed position to block overtravel in a first direction (e.g., clockwise), and/or a stop block may be positioned behind the gate in an open position to block the gate in the second direction (e.g., counter-clockwise). It is presently recognized that stopping the gate using external structures may introduce undesirable pinch points.

With the foregoing in mind, systems described herein relate generally to a gate having an internal hard stop configured to block rotation of the gate beyond a desired range of motion. At extremes of the desired range of motion, components of the gate may abut one another to resist further rotation. Specifically, the gate may include a gate post and a gate frame attached to one another via a hinge assembly. The gate post may be fixed (e.g., to the ground) and the hinge assembly may rotatably couple the gate frame to the gate post. The hinge assembly may include an end cap having a flange portion coupled to the gate post and a shaft portion rotatably coupled to the gate frame. For example, the shaft portion may extend into an axial member of the gate frame such that the axial member is configured to rotate about the shaft portion. As such, the gate is configured to rotate about an axis of rotation aligned with the shaft portion and the axial member. In certain embodiments, a bushing may be disposed within the axial member, and the shaft portion may be inserted through the bushing into the axial member. In this way, the axial member may rotate around the shaft portion as the bushing provides sliding contact against the shaft portion.

The end cap may further include one or more prongs (e.g., a first prong and a second prong) extending from an end of the shaft portion into the axial member. The first prong and the second prong may be radially opposite one another. Additionally, the gate may include a rod extending across the axial member, intersecting the axis of rotation. The rod may be coupled to the axial member such that the rod rotates in a horizontal plane as the axial member rotates about the axis of rotation. In some embodiments, the rod may extend across the axial member between a first prong and a second prong of the one or more prongs. As the rod rotates (e.g., clockwise or counter-clockwise), the gate frame may rotate about the axial member until the rod abuts (e.g., bumps into) the first prong and/or the second prong. Thus, the gate may be blocked from rotating further. In this way, the hinge assembly may prevent overtravel of the gate without exposing pinch points, such as an external hard stop.

Turning now to the drawings, FIG. 1 illustrates a gate 10 that may be used in a venue, such as an amusement park, to allow or block foot traffic. A person (e.g., park guest) may push the gate 10 open to enter or exit a portion of the venue, such as a ride attraction. In response to a force applied to the gate 10, the gate 10 may swing open to allow passage of the person through the gate 10. Subsequently, once the person has moved through the gate 10, the gate 10 may swing shut (e.g., automatically) to block passage therethrough.

In certain embodiments, the gate 10 may include a gate frame 12 coupled to a gate post 14 via a hinge assembly 16 (e.g., upper hinge assembly). The gate frame 12 is configured to rotate (e.g., swing, pivot) about the hinge assembly 16 between a first position 18 (e.g., closed) and a second position (e.g., open). As discussed above, the hinge assembly 16 may be configured to limit a range of motion of the gate 10 by blocking rotation of the gate frame 12 past the first position 18 and/or the second position. For example, the gate 10 is shown in the first position 18, where the hinge assembly 16 blocks further clockwise rotation (e.g., relative to an axis of the gate post 14). The gate 10 may be opened by applying a force to the gate frame 12 in a counterclockwise direction (e.g., relative to the axis of the gate post 14) until the gate 10 rotates to the second position.

The gate post 14 may be fixed (e.g., cantilevered) to the ground or a floor. For example, a base 20 of the gate post 14 may be set in a hole in the ground using concrete, or the base 20 may be otherwise fixed to the ground (e.g., welded to another structure fixed to the ground, fastened to another structure fixed to the ground via one or more fasteners, and so forth). In certain embodiments, the gate post 14 may include a first mounting surface 22 formed in or coupled to an upper end of the gate post 14. The first mounting surface 22 provides a surface to which the hinge assembly 16 and the gate frame 12 may be attached. For example, the first mounting surface 22 may be a horizontal surface with one or more holes (e.g., tapped holes) configured to receive a fastener (e.g., bolts, screws, and so forth). In certain embodiments, the first mounting surface 22 may extend laterally from the gate post 14, toward the hinge assembly 16 and the gate frame 12. In certain embodiments, the gate post 14 may also include a first brace 24 (e.g., a triangular brace or other suitable brace) extending from the gate post 14 to support the connection between the first mounting surface 22 and the hinge assembly 16. Thus, the first mounting surface 22 may support the gate frame 12 at an upper end of the gate frame 12, via the hinge assembly 16. Additionally, in certain embodiments, the gate post 14 may include a second mounting surface 26 and a second brace 28 extending laterally from the gate post 14 near a lower end of the gate post 14. The second mounting surface 26 may support the gate frame at a lower end of the gate frame 12. Specifically, the first mounting surface 22 and the second mounting surface 26 may support opposite ends of an axial member 30 of the gate frame 12 extending generally parallel to the gate post 14. The axial member 30 is aligned with an axis of rotation 32 of the gate frame 12.

In certain embodiments, the gate 10 may include a self-closing device 34 configured to bias the gate 10 toward the first position 18 or the second position. For example, the self-closing device 34 may include a spring (e.g., a torsion spring or other suitable spring) that applies a restoring force or torque on the gate frame 12 (e.g., to bias the gate frame 12 toward the first position 18) when the gate frame 12 is rotated away (e.g., opened) from the first position 18. Additionally or alternatively, in certain embodiments, the self-closing device 34 may include a mechanical linkage (e.g., cam, cam surface) configured to convert rotary motion of the gate into vertical linear motion of the mechanical linkage. As the gate 10 is turned toward the second position, the self-closing device 34 may store energy (e.g., spring energy, gravitational potential energy). When the gate 10 is released, the stored energy may facilitate closing action of the gate 10 toward the first position 18. In this way, the gate frame 12 may automatically close behind a person that has passed through the gate 10. In certain embodiments, the self-closing device 34 may also include a damping element (e.g., dashpot or other suitable damper) configured to apply a damping force against the spring force to soften the closing of the gate 10. In certain embodiments, the self-closing device 34 may be disposed at an interface between the axial member 30 and the second mounting surface 26.

In the illustrated embodiment, the hinge assembly 16 is disposed at an upper end of the axial member 30, and the self-closing device 34 is disposed near a lower end of the axial member 30. However, in other embodiments, the hinge assembly 16 may be disposed at or near the lower end, and/or the self-closing device 34 may be disposed at or near the upper end. Additionally, in certain embodiments, the gate 10 may include a first hinge assembly 16 disposed at or near the upper end and a second hinge assembly 16 disposed at or near the lower end. In certain embodiments, an entryway may include an additional gate mirrored and adjacent to the gate 10 to form a double doored gate.

Figure 2:
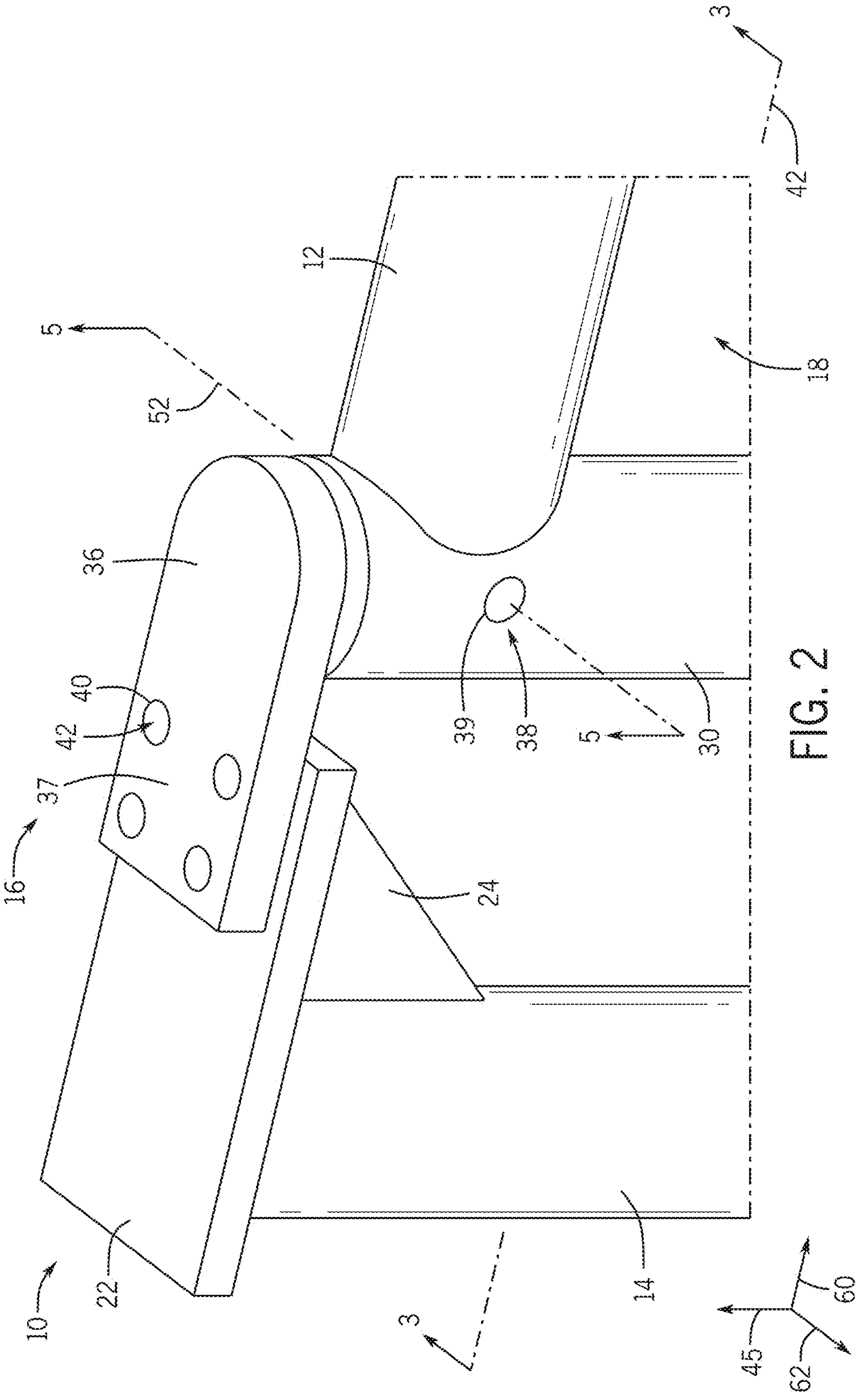
FIG. 2 is a perspective view of a hinge assembly that may be used in the gate of FIG. 1, in accordance with embodiments of the present disclosure.

FIG. 2 illustrates the hinge assembly 16 of the gate 10 in greater detail. In particular, the hinge assembly 16 may include an end cap 36 that may be coupled (e.g., fixedly coupled) to the gate post 14 (e.g., via the first mounting surface 22) and that may be coupled (e.g., rotatably coupled) to the gate frame 12 (e.g., at the axial member 30). In certain embodiments, the end cap 36 may include a flange portion 37 configured to couple to the gate post 14. In certain embodiments, the flange portion 37 may include one or more mounting holes 40 through which one or more fasteners 42 (e.g., screws, bolts, and so forth) may extend to secure the end cap 36 to the gate post 14 (e.g., via the first mounting surface 22). In certain embodiments, the gate 10 may further include a rod 38 (e.g., pin, bar, member, and so forth) extending transversely through the axial member 30. In certain embodiments, the rod 38 may be inserted into the axial member 30 via diametrically opposed apertures 39 formed in the axial member 30. The functions of the end cap 36 and the rod 38 are discussed in greater detail below, with reference to FIGS. 3-6.

Figure 3:
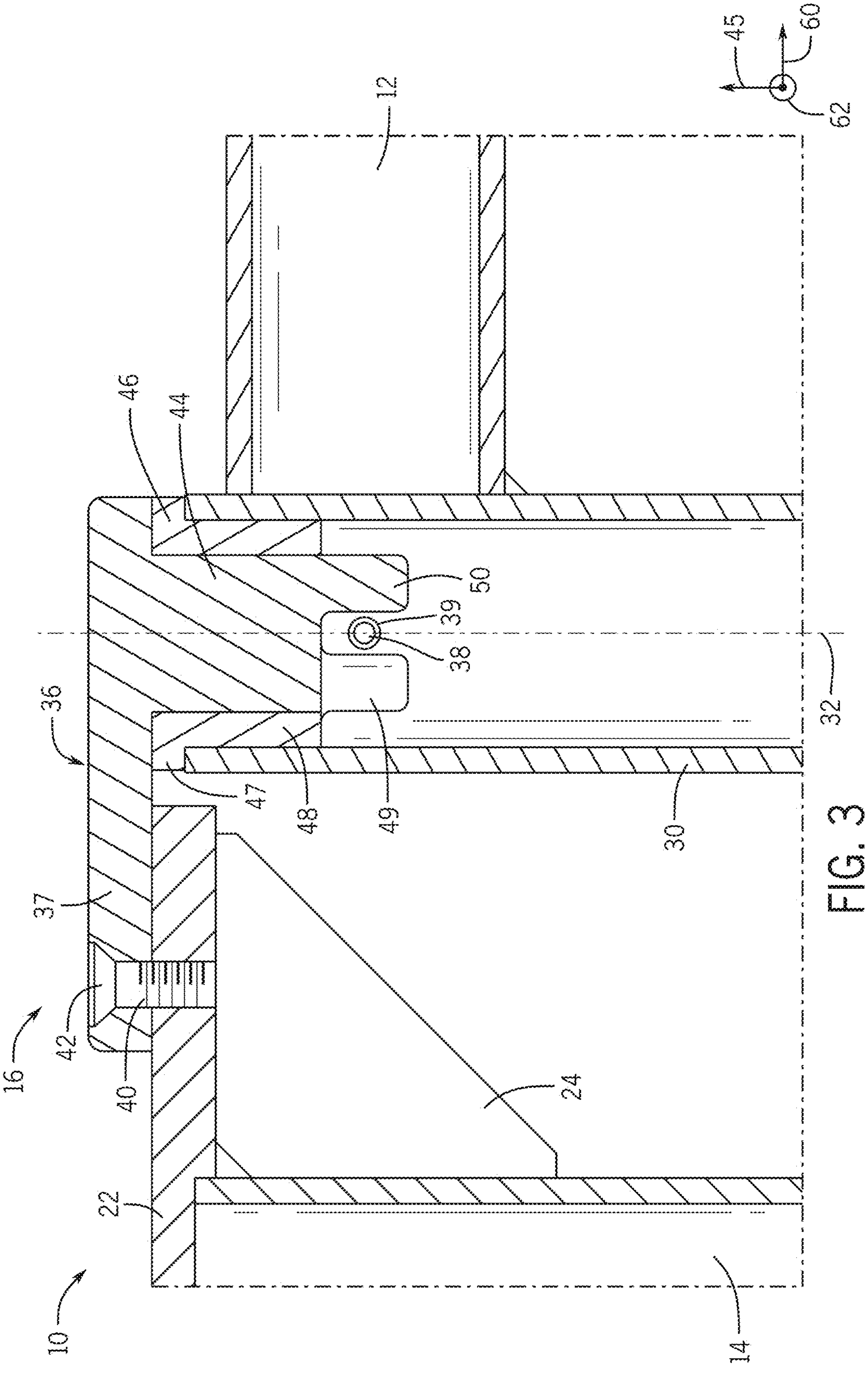
FIG. 3 is a side cross-sectional view of the hinge assembly of FIG. 2, in accordance with embodiments of the present disclosure.

FIG. 3 is a side cross-sectional view of a portion of the gate 10 taken from cutting plane line 52 shown in FIG. 2 (e.g., a plane generally parallel to the axes of a vertical direction 45 and a lateral direction 60). As illustrated, in certain embodiments, the axial member 30 may be at least partially hollow. For example, the axial member 30 may be a tube and/or include a cavity extending along the axis of rotation 32. In certain embodiments, the end cap 36 may include a shaft portion 44 extending vertically (e.g., in the vertical direction 45) from the flange portion 37 into the axial member 30. In certain embodiments, a bushing 46 or a bearing (e.g., roller bearing, ball bearing, hydrostatic bearing, and so forth) may also be disposed within the axial member 30, aligned with the axis of rotation 32. In certain embodiments, the shaft portion 44 may extend through the bushing 46 and into the axial member 30. In other words, the bushing 46 may be annularly disposed around the shaft portion 44, and the axial member 30 may be annularly disposed around the bushing 46. In certain embodiments, the bushing 46 may include a bushing flange 47 having an outer diameter greater than an inner diameter of the axial member 30. In certain embodiments, the bushing 46 may rest on the axial member 30 with the bushing flange 47 disposed (e.g., sandwiched) between the upper end of the axial member 30 and the end cap 36. In certain embodiments, the bushing 47 may also include an inserted portion 48 having an outer diameter smaller than an inner diameter of the axial member 30. The inserted portion 48 may be inserted and/or press fit into the upper end of the axial member 30. In this way, the shaft portion 44 may be in sliding contact with the bushing 46 as the axial member 30 rotates about the shaft portion 44.

As discussed above, the axial member 30 may include the apertures 39 through which the rod 38 may be inserted to span a diameter of the axial member 30. In certain embodiments, the end cap 36 may include a first prong 49 and a second prong 50 extending vertically from the shaft portion 44 further into the axial member 30. In such embodiments, the rod 38 may span the axial member 30 between the first prong 49 and the second prong 50. Engagements between the rod 38 and the end cap 36 are described below with reference to FIGS. 4 and 5. In other embodiments, the end cap 36 may include a single prong (e.g., the first prong 49, without the second prong 50).

Figure 4:
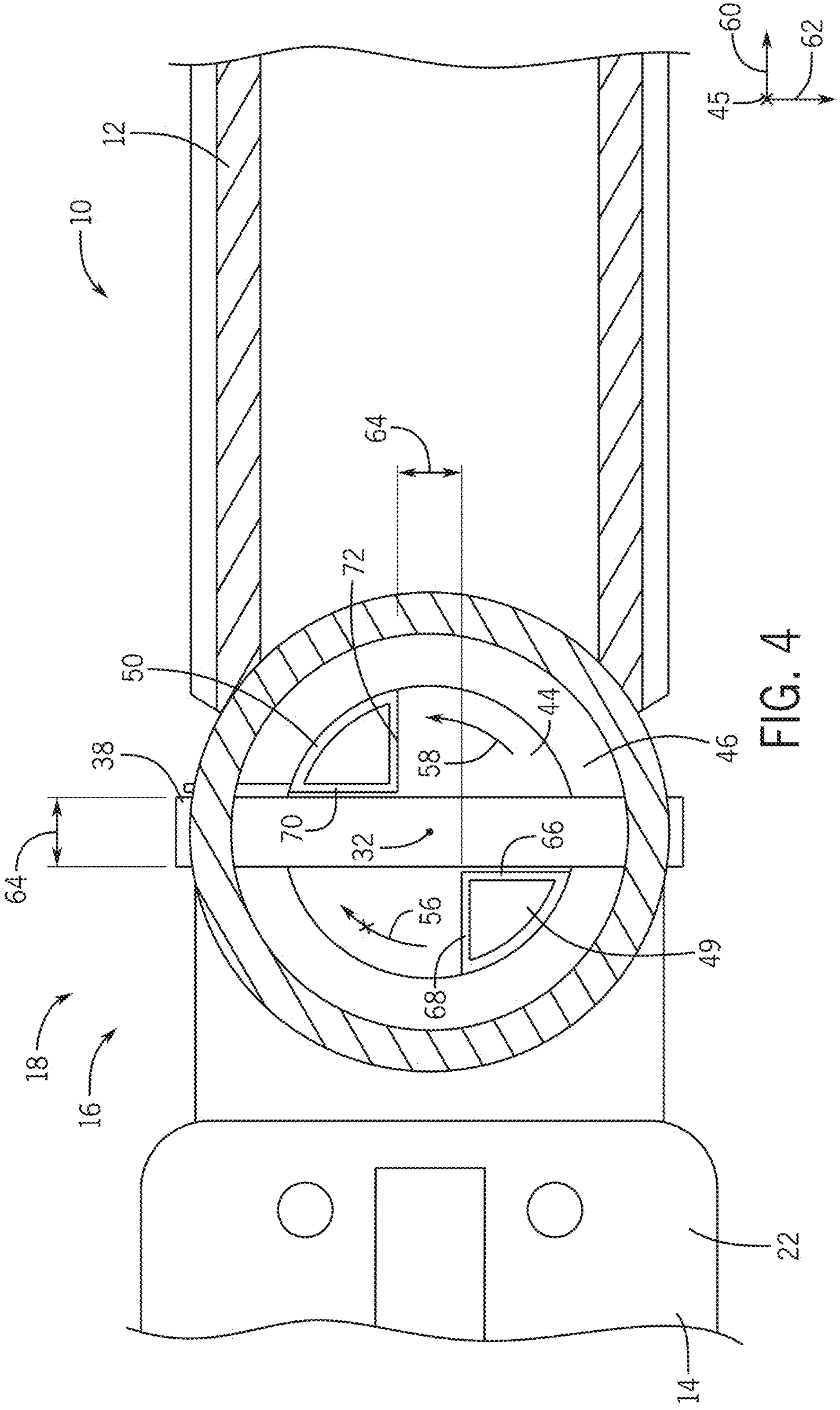
FIG. 4 is a bottom cross-sectional view of the hinge assembly of FIG. 2 in a first position, in accordance with embodiments of the present disclosure.
Figure 5:
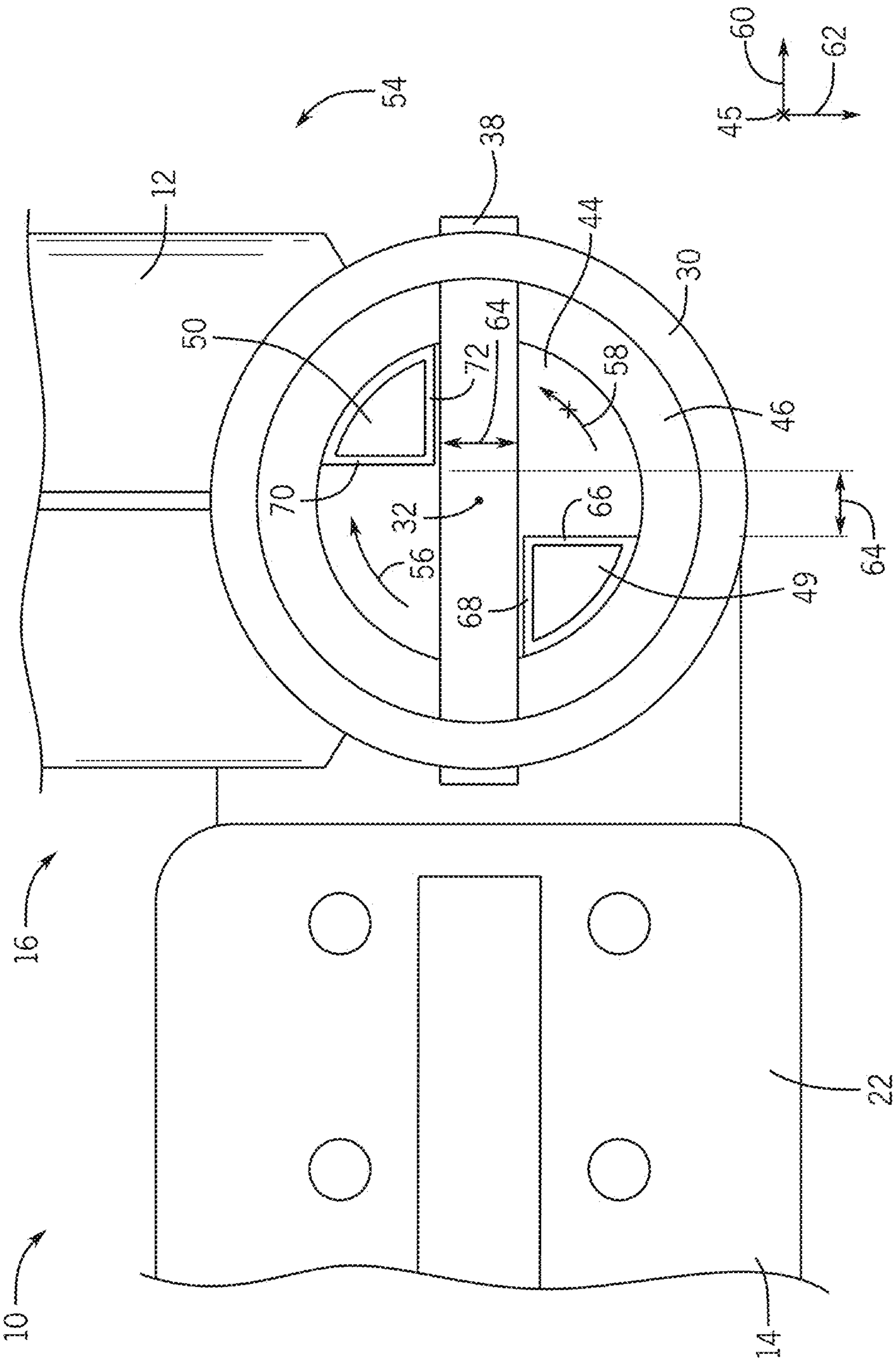
FIG. 5 is a bottom cross-sectional view of the hinge assembly of FIG. 2 in a second position, in accordance with embodiments of the present disclosure.

FIGS. 4 and 5 illustrate a cross section of a portion of the gate 10 viewed in a plane parallel to the cutting plane defined by the cutting plane line 52 of FIG. 2 (e.g., a plane generally parallel to the axes of a longitudinal direction 62 and the lateral direction 60). In FIG. 4, the gate 10 is illustrated in the first position 18, wherein the first prong 49 and the second prong 50 block the rod 38 from rotating in a first rotational direction 56. In FIG. 5, the gate 10 is in a second position 54, wherein the first prong 49 and the second prong 50 block the rod 38 from rotating in a second rotational direction 58 (e.g., opposite the first rotational direction 56). The rod 38 may extend across a diameter of the axial member 30, perpendicular to the axis of rotation 32.

The first prong 49 and the second prong 50 may extend from any suitable point on the shaft portion 44 to provide a desired resting position of the rod 38 relative to the gate post 14 when the rod 38 abuts the first prong 49 and the second prong 50. That is, when the rod 38 abuts the first prong 49 and the second prong 50 in the first position 18, the orientation or the rod 38 relative to the gate post 14 may depend on the position of the first prong 49 and the second prong 50. For example, the first prong 49 and the second prong 50 may be offset from one each other in the lateral direction 60 and in the longitudinal direction 62 by an offset distance 64. As shown, the offset distance 64 may be substantially equal to a thickness of the rod 38. As a result, the first prong 49 and the second prong 50 may constrain the range of motion of the rod 38 within 90 degrees between the first position 18 and the second position 54.

Additionally, the range of motion of the rod 38 may depend on the shapes of the first prong 49 and the second prong 50. For example, the first prong 49 may have a first face 66 that contacts the rod 38 in the first position 18 and a second face 68 that contacts the rod 38 in the second position 54. Likewise, the second prong 50 may have a third face 70 that contacts the rod 38 in the first position 18 and a fourth face 72 that contacts the rod 38 in the second position 54. The first face 66 and the second face 68 may be perpendicular to each other, and the third face 70 and the fourth face 72 may be perpendicular to each other. In this way, the rod 38 may come into flush contact with each of the faces 66, 68, 70, 72.

In certain embodiments, the first position 18 and the second position 54 may be characterized by alignment of the rod 38 in the longitudinal direction 62 and the lateral direction 60, respectively. That is, in the first position 18 illustrated in FIG. 4, the rod 38 may be oriented in the longitudinal direction 62, and the first face 66 and the third face 70 may be parallel to a plane in the longitudinal direction 62 and the vertical direction 45. Each of the first face 66 and the third face 70 may be laterally offset in opposing directions from the axis of rotation 32 by a distance of half of the thickness of the rod 64 (e.g., the offset distance 64). Likewise, each of the second face 68 and the fourth face 72 may be longitudinally offset in opposing direction from the axis of rotation 32 by half of the thickness of the rod 64. Thus, the rod 38 may rotate about the axis of rotation 32, sweeping between the first position 18 and the second position 54 until the rod 38 contacts the first prong 49 and the second prong 50 at the first face 66 and the third face 70, or at the second face 68 and the fourth face 72.

In the embodiment illustrated in FIGS. 4 and 5, the first prong 49 and the second prong 50 are positioned and shaped to provide a 90 degree range of motion between the first position 18 and the second position 54. For example, each of the first prong 49 and the second prong 50 may have a quarter-circular cross section protruding (e.g., extruded) from an axially facing surface of the shaft portion 44. The first face 66, the second face 68, the third face 70, and the fourth face 72 may correspond to (e.g. define) linear edges of the quarter-circular cross sections. The range of motion of the rod 38 and the gate frame 12 may vary based on the shape, position, and/or orientation of the first prong 49 and the second prong 50. For example, the positioning and shapes of the first prong 49 and the second prong 50 may be selected to provide a larger or smaller range of motion (e.g., degree of rotation). In certain embodiments, the first face 66 and the second face 68 may be obliquely angled from each other, and the third face 70 and the second face 72 may be obliquely angled from each other. As such, the rod 38 may abut the first prong 49 and the second prong 50 at a different angle than shown in FIGS. 4 and 5. Additionally, the gate frame 12 may be configured to open in either a clockwise direction (e.g., first rotational direction 56) or a counter-clockwise direction (e.g., second rotational direction 58), depending on the positions and orientations of the first prong 49 and the second prong 50. For example, if the first prong 49 and the second prong 50 as positioned as illustrated in FIGS. 4 and 5, the gate frame 12 may be configured to open in the second rotational direction 58. In other embodiments, however, the first prong 49 and the second prong 50 may be positioned such that when the rod 38 is in the first position 18 (e.g., a closed position), the rod 38 is stopped by the second face 68 and the fourth face 72 from rotating toward the second rotational direction 58. In certain embodiments, the first prong 49 and the second prong 50 may not have faces for flush contact with the rod 38 at all. For example, the first prong 49 and the second prong 50 may have a circular cross-section, such that the rod 38 abuts the first prong 49 and the second prong 50 at tangential points of contact.

Because the rod 38 is fixedly coupled to the gate frame 12, obstruction of the rod 38 by the first prong 49 and the second prong 50 blocks rotation of the gate frame 12 about the axis of rotation 32. Thus, the gate frame 10 may rotate within but not beyond the range of motion as constrained by the position and shape of the first prong 49 and the second prong 50. Shock loads (e.g., impact forces) of the rod 38 against the first prong 49 and the second prong 50 may be softened by damping forces produced by the self-closing device 34 described herein. For example, angular momentum of the gate frame 12 may be reduced by a self-closing device (e.g., the self-closing device 34 shown in FIG. 1) as the gate frame 12 approaches the first position 18 and/or the second position 54, and the damping element of the self-closing device 34 may be absorb rotational kinetic energy from the gate frame 12. In certain embodiments, the rod 38 may be a spring pin selected to withstand substantial loading (e.g., shock loading, bending, shear, and so forth). In such embodiments, the spring pin may have a coiled structure configured to absorb the impact of the rod 38 against the first prong 49 and the second prong 50.

In certain embodiments, the first prong 49 and/or the second prong 50 may be removably coupled to the shaft portion 44. For example, the shaft portion 44 may include one or more holes extending vertically into a face of the shaft portion 44, and the first prong 49 and/or the second prong 50 may be partially inserted into the hole(s) such that the first prong 49 and/or the second prong 50 protrude vertically from the face of the shaft portion 44 into the axial member 30. In certain embodiments, multiple holes may be formed at different points in the face of the shaft portion 44, and the first prong 49 and/or the second prong 50 may be selectively placed into respective holes depending on a desired range of motion. In some embodiments, the end cap 36 may include a single prong (e.g., one of the first prong 49 or the second prong 50), instead of two prongs. In the first position 18, the rod 38 may contact the single prong at one point of contact (e.g., the first face 66). In the second position 54, the rode 38 may contact the single prong at another point of contact (e.g., at the second face 68). In each of the first position 18 and the second position 54, the single prong may stop rotation of the rod 38 to limit the motion of the gate frame 12 within the desired range of motion.

Figure 6:
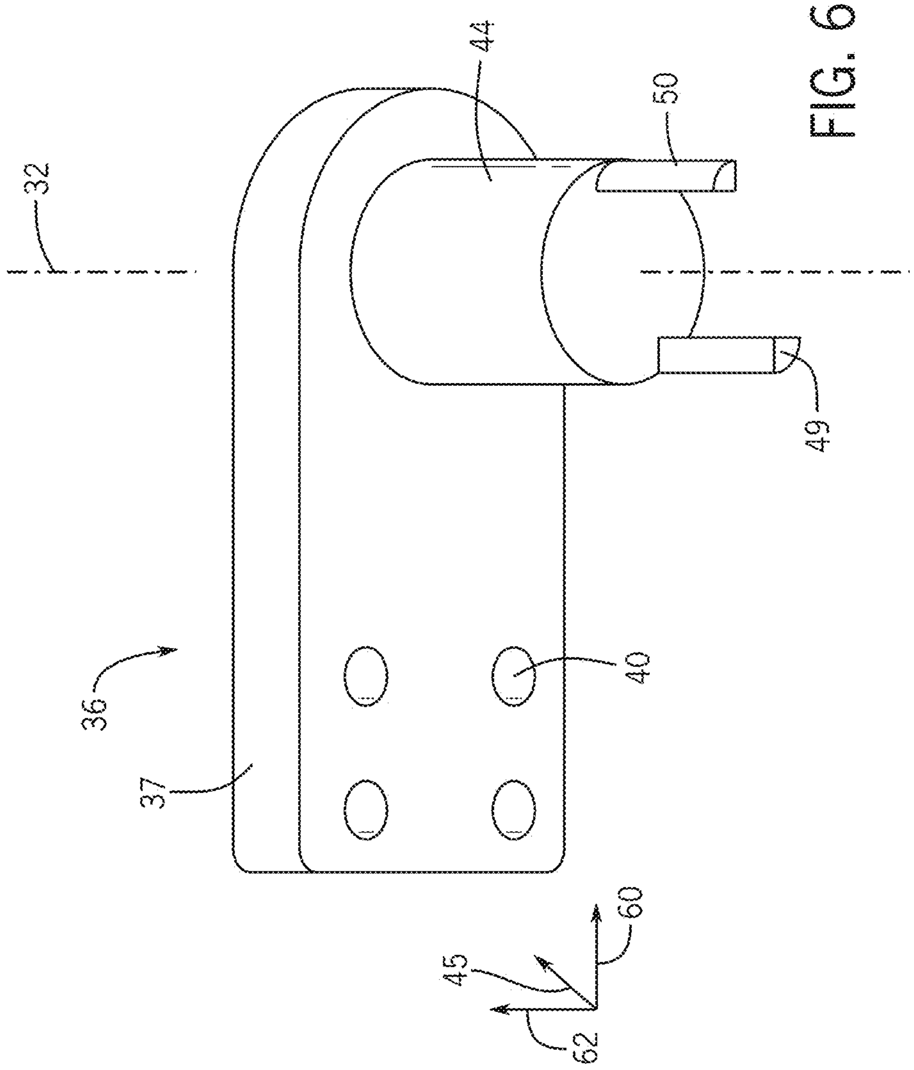
FIG. 6 is a perspective view of an end cap that may be used in the hinge assembly of FIG. 1, in accordance with embodiments of the present disclosure.

FIG. 6 illustrates the end cap 36 removed from the rest of a gate (e.g., the gate 10 illustrated in FIG. 1). As discussed above, the first prong 49 and the second prong 50 protrude from the shaft portion 44 along the vertical direction 45. The holes 40 formed in the flange portion 37 (e.g., as illustrated in FIGS. 2 and 3) enable easy removal of the end cap 36 from a gate post and a gate frame (e.g., the gate post 14 and the gate frame 12 shown in FIG. 1). For example, when maintenance is to be performed on a gate (e.g., gate 10 shown in FIG. 1), a technician may unfasten fasteners (e.g., the fasteners 42 shown in FIG. 3) to decouple the flange portion 37 from a gate post (e.g., the gate post 14). Additionally, the shaft portion 44 may be extracted from an axial member of a gate frame (e.g., the axial member 30 of the gate frame 12 shown in FIGS. 1 and 2). Then, the gate frame may be decoupled from the gate post entirely.

Figure 7:
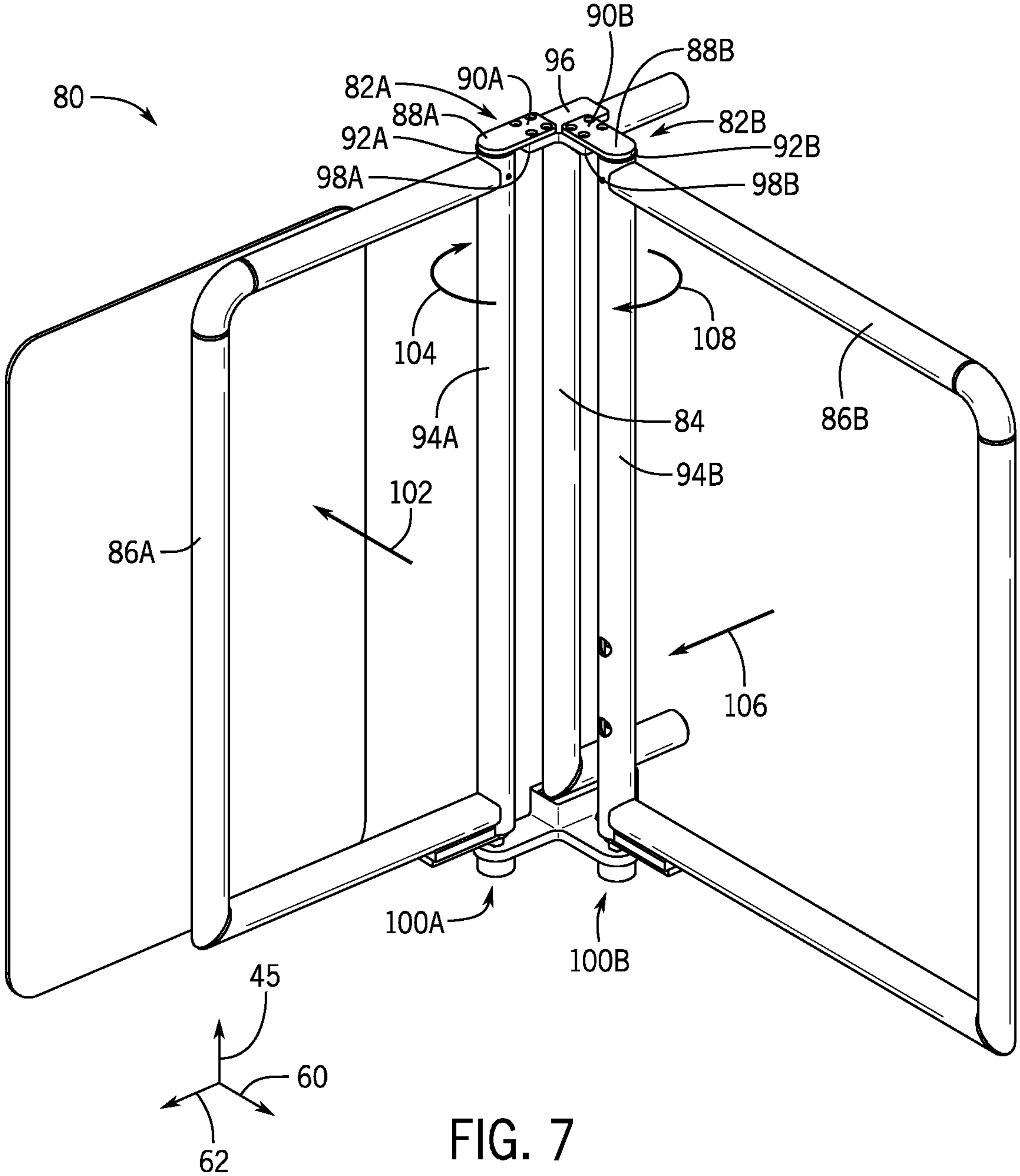
FIG. 7 is a perspective view of a dual gate assembly, in accordance with embodiments of the present disclosure.

FIG. 7 illustrates an embodiment of a dual gate system 80 having a first hinge assembly 82A and a second hinge assembly 82B coupled to a single gate post 84. The first hinge assembly 82A is configured to pivotally couple a first gate frame 86A to the gate post 84, and the second hinge assembly 82B is configured to pivotally couple a second gate frame 86B to the gate post 84. The first hinge assembly 82A and the second hinge assembly 82B may each operate according to the mechanics described above with respect to the embodiments of FIGS. 1-6. That is, the first hinge assembly 82A may include a first end cap 88A having a first flange portion 90A coupled to the gate post 84 and a first shaft portion 92A configured to extend into a first axial member 94A of the first gate frame 86A. The first end cap 88A may include first and second prongs configured to engage with a first rod extending through the first axial member 94A to limit a range of rotation of the first gate frame 86A about the first end cap 88A. The second hinge assembly 82B may have a similar construction to the first hinge assembly 82A, including a second end cap 88B with a second flange portion 90B coupled to the gate post 84 and a second shaft portion 92B configured to extend into a second axial member 94B of the second gate frame 86B. In this way, rotation of the first gate frame 86A and the second gate frame 88B may be limited to respective ranges of motion (e.g., from 0° to 60°, 90°, 110°, or another suitable angle).

The gate post 84 of the dual gate system 80 may include a two-headed mounting surface 96 formed in or coupled to an upper end of the gate post 84. The two-headed mounting surface 96 provides a surface to which the first hinge assembly 82A and the second hinge assembly 82B may be attached. The two-headed mounting surface 96 may include a first mounting area 98A extending radially outward from the gate post 84 in a first direction (e.g., the lateral direction 60) and a second mounting area 98B extending radially outward from the gate post 84 in a second direction (e.g., the longitudinal direction 62). The first direction and the second direction may be perpendicular to one another. The first end cap 88A may be coupled to the first mounting area 98A, and the second end cap 88B may be coupled to the second mounting area 98B. The dual gate system 80 may also include a first self-closing device 100A and a second self-closing device 100B configured to bias the first gate frame 86A and the second gate frame 86B toward respective closed positions.

In some embodiments, the first gate frame 86A and the second gate frame 86B may be configured to swing "out" in the direction of anticipated foot traffic through each gate frame. For example, an amusement park attraction may be designed such that a first flow of traffic (e.g., park guests) tends to travel in a first direction 102 through the first gate frame 86A. Accordingly, the first hinge assembly 82A may be configured enable the first gate frame 86A to open in a first rotational direction 104 (e.g., clockwise) corresponding to the first direction 102. As the first gate frame 86A is pushed in the first direction 102, the first axial member 94A may rotate about the end cap 88A in the first rotational direction 104. Additionally, a second flow of traffic (e.g., park employees) may travel in a second direction 106 through the second gate frame 86B. Accordingly, the second hinge assembly 82B may be configured to enable the second gate frame 86B to open in a second rotational direction 108 (e.g., clockwise) corresponding to the second direction 106. The first rotational direction 104 and the second rotational direction 108 may be the same (e.g., both clockwise), as shown in FIG. 7, or they may be opposite (e.g., one clockwise and the other counterclockwise). As discussed above, the direction and extent of the opening of each gate frame may be configured based on the shape, position, and/or angle of the prongs of the first end cap 88A and the second end cap 88B.

As described in detail above, embodiments of the present disclosure are directed to a gate 10 having a hinge assembly 16 that is configured to limit rotation of the gate 10 within a desired range of motion using an internal hard stop mechanism (e.g., the prongs 49, 50 and the rod 38). The hinge assembly 16 may include an end cap 36 configured to rotatably couple a gate frame 12 to a gate post 14. The end cap 36 may include a flange portion 37 fixedly mounted on the gate post 14, as well as a shaft portion 44 extending into an axial member 30 of the gate frame 12. The axial member 30 may be annularly disposed and free to rotate about the shaft portion 44. Thus, the shaft portion 44 may define an axis of rotation 32 about which the gate frame 12 may swing. The end cap 36 may include a first prong 49 and a second prong 50 extending from the shaft portion 44 further into the axial member 30. A rod 38 may extend transversely through the axial member 30 between the first prong 49 and the second prong 50. As the axial member 30 rotates, the rod 38 may rotate between a first position and a second position. In the first position (e.g., as illustrated in FIG. 4), the first prong 49 and the second prong 50 may block the rod 38 from rotating in a first rotational direction 56. In the second position (e.g., as illustrated in FIG. 5), the first prong 49 and the second prong 50 may block the rod 38 from rotating in a second rotational direction 58 opposite the first rotational direction 56.

While only certain features of the invention have been illustrated and described herein, many modifications and changes will occur to those skilled in the art. For example, although the present disclosure is nominally directed to a hinge assembly for a gate, the techniques disclosed herein may be applied to a door. It is, therefore, to be understood that the appended claims are intended to cover all such modifications and changes as fall within the true spirit of the invention.

Furthermore, in an effort to provide a concise description of the exemplary embodiments, all features of an actual implementation may not have been described, such as those unrelated to the presently contemplated best mode, or those unrelated to enablement. It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for (perform)ing (a function) . . . " or "step for (perform)ing (a function) . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A gate, comprising:
a gate post;
a gate frame comprising an axial member extending along an axis of rotation of the gate frame; and
a hinge assembly pivotally coupling the gate frame to the gate post, wherein the hinge assembly comprises:
an end cap comprising:
a flange portion fixedly coupled to the gate post;
a shaft portion extending into the axial member of the gate frame; and
one or more prongs extending from the shaft portion internally into the axial member substantially parallel to the axis of rotation; and
a rod extending laterally through the axial member of the gate frame.

2. The gate of claim 1, wherein the one or more prongs comprise a first prong and a second prong, and the rod extends laterally through the axial member between the first prong and the second prong.

3. The gate of claim 2, wherein:
the first prong comprises a first face configured to abut the rod in a first rotational position;
the first prong comprises a second face configured to abut the rod in a second rotational position;
the second prong comprises a third face configured to abut the rod in the first rotational position; and
the second prong comprises a fourth face configured to abut the rod in the second rotational position.

4. The gate of claim 3, wherein the first face and the third face are substantially parallel to each other, and the second face and the fourth face are substantially parallel to each other.

5. The gate of claim 3, wherein the first face and the second face are substantially perpendicular.

6. The gate of claim 1, wherein:
the hinge assembly comprises a bushing disposed at an end of the axial member of the gate frame;
the bushing comprises an inserted portion and a bushing flange; and
the axial member is configure to rotate about the bushing.

7. The gate of claim 6, wherein the hinge assembly is configured to place the bushing and the axial member in sliding contact with each other.

8. The gate of claim 1, wherein the axial member comprises two apertures diametrically opposite each other through a wall of the axial member, and the rod extends through the two apertures.

9. The gate of claim 1, comprising a self-closing device configured to bias the gate frame toward a closed position.

10. The gate of claim 1, wherein the rod is a spring pin.

11. The gate of claim 6, wherein the axial member is annularly disposed around at least part of the bushing.

12. A hinge assembly for a gate, comprising:
an end cap configured to rotatably couple a gate frame to a gate post, wherein the end cap comprises:
a flange portion configured to be fixedly coupled to the gate post;
a shaft portion configured to be inserted into an axial member of the gate frame; and
a first prong and a second prong, each extending from the shaft portion; and
a rod configured to extend laterally though the axial member of the gate frame within a rotational range of motion between the first prong and the second prong, wherein the first prong and the second prong are configured to prevent movement of the rod beyond the rotational range of motion between the first prong and the second prong.

13. The hinge assembly of claim 12, wherein the shaft portion and the axial member are configured to be aligned with an axis of rotation of the gate frame when the shaft portion is inserted into the axial member of the gate frame.

14. The hinge assembly of claim 13, wherein:
the first prong comprises a first face configured to abut the rod in a first rotational position;
the first prong comprises a second face configured to abut the rod in a second rotational position;
the second prong comprises a third face configured to abut the rod in the first rotational position; and
the second prong comprises a fourth face configured to abut the rod in the second rotational position.

15. The hinge assembly of claim 12, comprising a bushing configured to be inserted into the axial member, wherein the bushing is annularly disposed around the shaft portion.

16. An end cap of a hinge assembly for a gate, comprising:
a flange portion configured to be mounted on a gate post;
a shaft portion extending from the flange portion, wherein the shaft portion is configured to be inserted into a gate frame, wherein the shaft portion defines an axis of rotation of the gate;
a first prong having a first cross section and extending from the shaft portion, wherein the first cross section comprises a first face and a second face adjacent to each other; and
a second prong having a second cross section and extending from the shaft portion, wherein the second cross section comprises a third face and a fourth face adjacent to each other, and wherein the first prong and the second prong are spaced apart from each other across the axis of rotation;
wherein the first face, the second face, the third face, and the fourth face are configured to limit a rotational range of motion of the gate about the axis of rotation of the gate.

17. The end cap of claim 16, wherein the flange portion comprises one or more holes configured to receive one or more fasteners for mounting the flange portion on the gate post.

18. The end cap of claim 16, wherein:
the first face and the third face are laterally offset from each other across the axis of rotation; and
the second face and the fourth face are longitudinally offset from each other across the axis of rotation.

19. The end cap of claim 16, wherein the first face and the second face are substantially perpendicular to each other.

20. The end cap of claim 16, wherein the first face and the third face are substantially parallel to each other.

* * * * *